US012491546B2

(12) United States Patent
Ogawa et al.

(10) Patent No.: US 12,491,546 B2
(45) Date of Patent: Dec. 9, 2025

(54) CONTAINER WASHING FACILITY

(71) Applicant: SUNTORY HOLDINGS LIMITED, Osaka (JP)

(72) Inventors: Naohiko Ogawa, Inuyama (JP); Masashi Tanaka, Inuyama (JP); Takashi Inoue, Inuyama (JP); Toshiki Iwasaki, Inuyama (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 204 days.

(21) Appl. No.: 18/028,593

(22) PCT Filed: Sep. 28, 2021

(86) PCT No.: PCT/JP2021/035685
§ 371 (c)(1),
(2) Date: Mar. 27, 2023

(87) PCT Pub. No.: WO2022/065513
PCT Pub. Date: Mar. 31, 2022

(65) Prior Publication Data

US 2023/0356271 A1 Nov. 9, 2023

(30) Foreign Application Priority Data

Sep. 28, 2020 (JP) ................................ 2020-162268

(51) Int. Cl.
*B08B 9/28* (2006.01)
*B08B 9/30* (2006.01)
(Continued)

(52) U.S. Cl.
CPC ................ *B08B 9/283* (2013.01); *B08B 9/30* (2013.01); *B08B 9/34* (2013.01); *B65B 55/24* (2013.01); *B08B 2209/08* (2013.01)

(58) Field of Classification Search
CPC ........... B08B 6/00; B08B 3/022; B08B 5/023; B08B 9/08; B08B 9/0813; B08B 9/0821;
(Continued)

(56) References Cited

U.S. PATENT DOCUMENTS

2012/0247512 A1* 10/2012 Wu ........................... B08B 9/30
137/15.01
2017/0368583 A1 12/2017 Hosaka et al.

FOREIGN PATENT DOCUMENTS

JP 56-100398 U 8/1981
JP 5-208180 A 8/1993
(Continued)

OTHER PUBLICATIONS

Notification of Transmittal of Translation of the International Preliminary Report on Patentability (Form PCT/IB/338) issued in counterpart International Application No. PCT/JP2021/035685 mailed Apr. 6, 2023 with Forms PCT/IB/373 and PCT/ISA/237. (6 pages).
(Continued)

*Primary Examiner* — David G Cormier
(74) *Attorney, Agent, or Firm* — WHDA, LLP

(57) ABSTRACT

To save washing water, a container washing facility for washing an inner surface of a can (2) before the can (2) is filled with a material includes a conveyor (9) that conveys the can (2) at least in a posture of being inverted with an opening (2*a*) of the can (2) facing downward, a cleaning air jetting unit (10) located along a conveying path of the can (2) conveyed by the conveyor (9) to jet cleaning air to the inner surface of the can (2) through the opening (2*a*) of the can (2) while the can (2) is being conveyed, and a washing water jetting unit (11) located along the conveying path of the can (2) conveyed by the conveyor (9) to jet washing water to the inner surface of the can (2) through the opening (2*a*) of the can (2) while the can (2) is being conveyed.

7 Claims, 3 Drawing Sheets

(51) Int. Cl.
*B08B 9/34* (2006.01)
*B65B 55/24* (2006.01)

(58) Field of Classification Search
CPC ......... B08B 9/0826; B08B 9/093; B08B 9/20; B08B 9/28; B08B 9/283; B08B 9/286; B08B 9/30; B08B 9/32; B08B 9/34; B08B 2209/08; B05B 13/0609; B05B 13/0627; B05B 13/0645; B65B 55/24
See application file for complete search history.

(56) References Cited

FOREIGN PATENT DOCUMENTS

| | | | |
|---|---|---|---|
| JP | 2001-187369 | A | 7/2001 |
| JP | 2013-27874 | A | 2/2013 |
| JP | 2017-051897 | A | 3/2017 |
| JP | 2017-131811 | A | 8/2017 |
| JP | 2018-94462 | A | 6/2018 |
| WO | 89/000953 | A1 | 2/1989 |

OTHER PUBLICATIONS

International Search Report dated Nov. 30, 2021, issued in counterpart Application No. PCT/JP2021/035685, with English translation. (13 pages).
Written Opinion dated Nov. 30, 2021, issued in counterpart Application No. PCT/JP2021/035685, with English translation. (8 pages).

* cited by examiner

CONTAINER WASHING FACILITY

FIELD

The present invention relates to a container washing facility for washing the inner surfaces of containers before the containers are filled with a material.

BACKGROUND

A beverage manufacturing plant as an example of a food manufacturing plant includes, for example, a storage facility to store cans before the cans are filled with beverages, a container washing facility to wash the cans, a filling facility to fill the washed cans with the beverages, a seaming facility to lid the beverage-filled cans, and a packaging facility to package every predetermined number of beverage-filled cans.

A container washing machine as an example of a container washing facility described in Patent Literature 1 jets washing water to wash the inner surfaces of cans while the cans are being conveyed.

CITATION LIST

Patent Literature

Patent Literature 1: Japanese Unexamined Patent Application Publication No. 2017-131811

BRIEF SUMMARY

Technical Problem

Such a container washing machine is expected to save washing water, while reliably removing foreign matter.

Solution to Problem

In response to the above, one or more aspects of the present invention are directed to a container washing facility that can save washing water.

In response to the above issue, a container washing facility according to an aspect of the present invention is a container washing facility for washing an inner surface of a container before the container is filled with a material. The container washing facility includes a conveyor that conveys the container at least in a posture of being inverted with an opening of the container facing downward, a cleaning air jetting unit located along a conveying path of the container conveyed by the conveyor to jet cleaning air to the inner surface of the container through the opening of the container while the container is being conveyed, and a washing water jetting unit located along the conveying path of the container conveyed by the conveyor to jet washing water to the inner surface of the container through the opening of the container while the container is being conveyed.

To remove foreign matter, such as hair, shrink films, sheets, and paper dust, adhering to the inner surface of the container with washing water alone, a large amount of washing water is used. In the above structure, with the cleaning air jetting unit located upstream from the washing water jetting unit, the cleaning air can cause foreign matter adhering to the inner surface of the container to separate from the inner surface of the container and can easily remove the foreign matter. This allows a large saving of water compared with washing with the washing water alone.

Some foreign matter may not be removed with the cleaning air. However, the washing water jetted by the washing water jetting unit located downstream can reliably wash away such foreign matter from the container.

In a structure with the cleaning air jetting unit located downstream from the washing water jetting unit, foreign matter may adhere to the inner surface of the container with washing water jetted in advance, possibly decreasing the washing effects. The above structure can avoid this.

In the aspect of the present invention, the washing water jetting unit may include a first water nozzle having a jet pattern spreading in a direction orthogonal to a conveying direction in which the container is conveyed, and a second water nozzle having a jet pattern spreading in the conveying direction of the container.

Through study, the inventors have noticed that, as described above, the washing water jetting unit including the two types of water nozzles having the jet patterns different from each other can evenly jet the washing water to the inside of the container and can thus efficiently remove foreign matter.

In the aspect of the present invention, the first water nozzle may have a jet angle ranging from 30 to 50 degrees, and the second water nozzle may have a jet angle ranging from 80 to 100 degrees.

A container such as a 202-diameter two-piece can may have an opening with an inner diameter (52.7 mm) smaller than, for example, the inner diameter (65.9 mm) of an opening of a 211-diameter two-piece can. A container washing facility optimized to wash the 211-diameter two-piece can may thus not effectively jet washing water to the inner surface of the 202-diameter two-piece can and may not sufficiently remove foreign matter. However, the inventors have noticed through study that the above structure can reliably remove foreign matter adhering to the inner surface of the container such as the 202-diameter two-piece can.

In the aspect of the present invention, the washing water jetting unit may be located to jet the washing water into the opening of the container in the posture of being inverted.

In the above structure, the washing water is jetted into the container in the posture of being inverted with its opening facing downward, and is drained from the container. This reduces the time for washing compared with a structure in which jetting and draining the washing water are performed independently of each other.

In the aspect of the present invention, the cleaning air jetting unit may include an air nozzle having a jet pattern extending straight in a jetting direction in which the cleaning air is jetted.

In the above structure, the cleaning air jetted by the air nozzle with the jet pattern extending straight in the jetting direction reaches the bottom of the container through the opening of the container, travels along the inner surface, and is discharged through the opening. The flow of this cleaning air removes foreign matter adhering to the inner surface of the container.

In the aspect of the present invention, the conveyor may convey the container in a posture of lying flat with the opening facing in a lateral direction in an area upstream from an area in which the container is in the posture of being inverted, and the cleaning air jetting unit may be located to jet the cleaning air into the opening of the container in the posture of lying flat.

During washing with the washing water, the container is to be in the posture of being inverted for draining. However, during cleaning with the cleaning air, the container may not be inverted. Thus, the cleaning air jetting unit may be located in an area corresponding to, for example, an area in which the container is in the posture of being lying flat while changing the posture to being inverted with its opening facing downward. Washing with the washing water is to be performed after foreign matter is removed with the cleaning air. Thus, with the cleaning air jetting unit located in an area corresponding to an area in which the container is in the posture of being inverted, the structure includes a longer section in which the container is in the posture of being inverted. However, the above structure can include a shorter area in which the container is in the posture of being inverted, thus downsizing the container washing facility.

In the aspect of the present invention, the cleaning air jetting unit may be located to jet the cleaning air from a height of 0.75 to 0.85 from a lowest portion of the opening of the container with respect to a height of the opening being 1.

Through study, the inventors have noticed that the above structure can remove foreign matter with the cleaning air more efficiently. In the area in which the container is lying flat, the height of 0.75 to 0.85 from the lowest portion of the opening of the container in the posture of being lying flat with respect to the height of the opening being 1 corresponds to the height of 40 to 43 mm from the lower end of the opening of a container being the 202-diameter two-piece can with its opening having an inner diameter of 52.7 mm.

DETAILED DESCRIPTION

Embodiments of a container washing facility according to the present invention will now be described with reference to the drawings.

Figure 1:
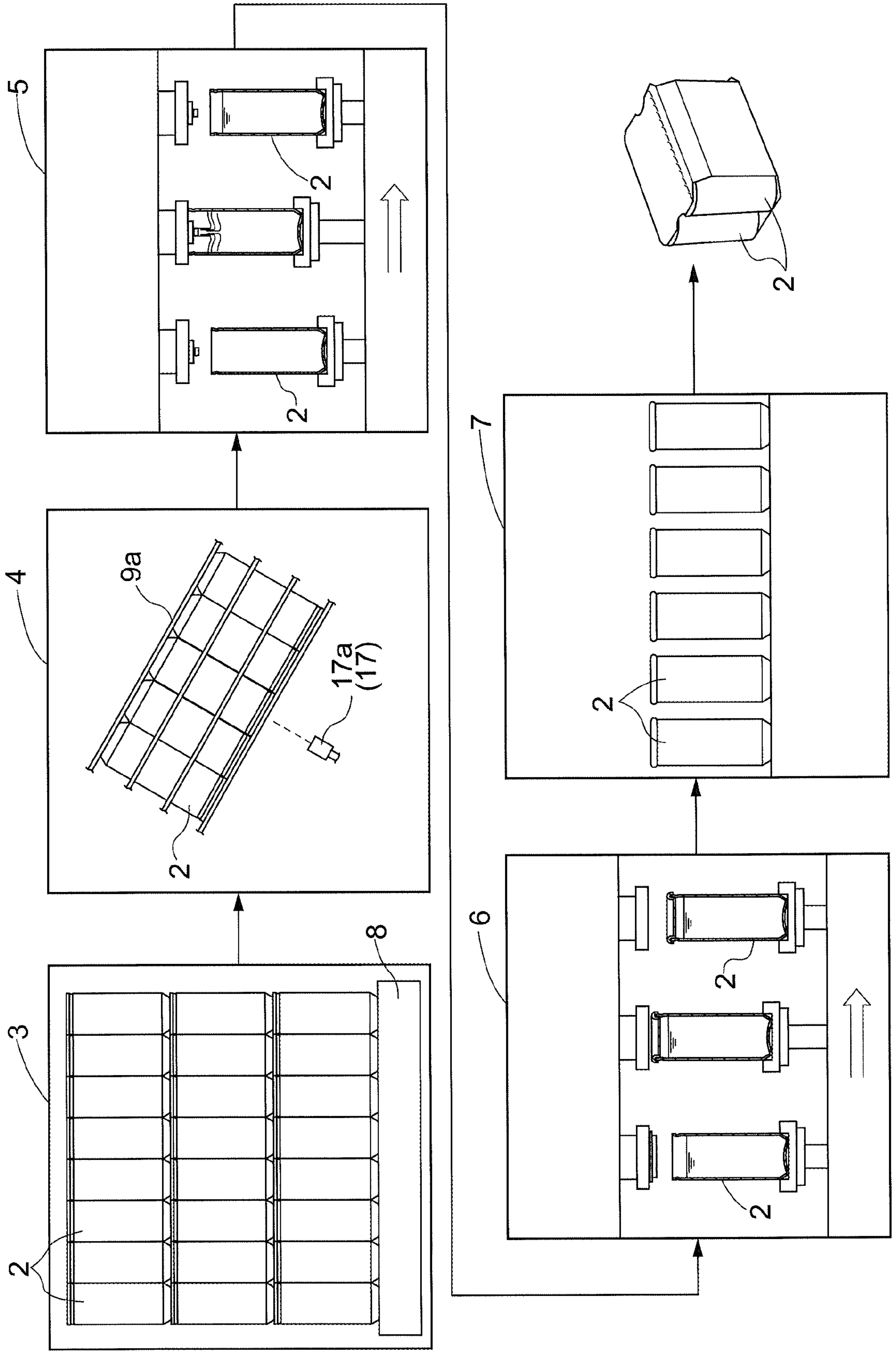
FIG. 1 is a schematic view of a beverage manufacturing plant.

As shown in FIG. 1, a beverage manufacturing plant, as an example of a food manufacturing plant, includes, for example, a storage facility 3 to store cans 2 before the cans 2 are filled with a beverage, a container washing facility 4 to wash the cans 2, a filling facility 5 to fill the cans 2 with the beverage, a seaming facility 6 to lid the beverage-filled cans 2, and a packaging facility 7 to package every predetermined number of beverage-filled cans 2.

In the present embodiment, the beverages correspond to foods in an aspect of the present invention, and the cans 2 correspond to containers in an aspect of the present invention. The cans 2 each are a metal can (two-piece 250 g can of 202 diameter). The cans 2 are stored in the storage facility 3 in which groups each including a predetermined number of cans 2 without lids are stacked on a pallet 8.

The storage facility 3 includes an unpacking apparatus, or a depalletizer. The cans 2 stacked on the pallet 8 are unpacked by the unpacking apparatus, and then are transported to the container washing facility 4.

As described later, the container washing facility 4 washes, before the cans 2 are filled with the beverage, at least the inner surfaces of the cans 2 stored in the storage facility 3.

The filling facility 5 receives the cans 2 washed by the container washing facility 4, and then fills each of the cans 2 with a predetermined amount of beverage.

The seaming facility 6 receives the cans 2 each filled with the predetermined amount of beverage from the filling facility 5 and then seams the cans 2 with lids.

The packaging facility 7 packages every predetermined number of beverage-filled cans seamed with lids by the seaming facility 6. The beverage-filled cans packaged by the packaging facility 7 are then shipped.

Figure 2:
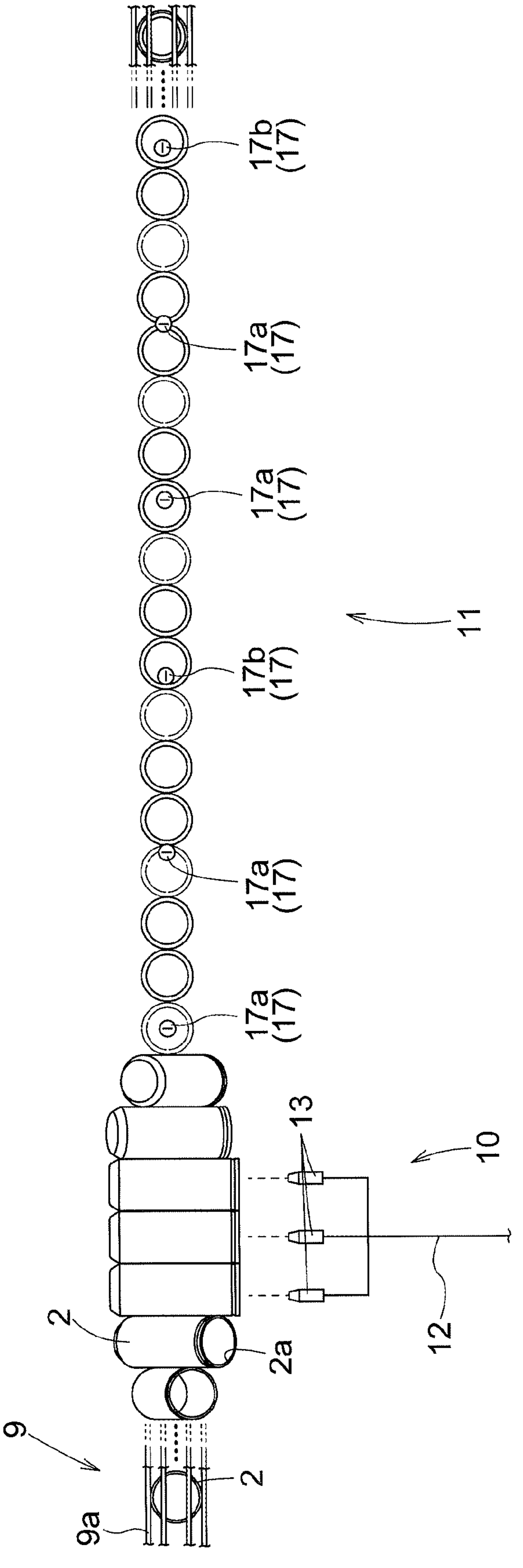
FIG. 2 is a schematic plan view of a container washing facility.

The above container washing facility 4 will now be described in detail. As shown in FIG. 2, the container washing facility 4 includes a conveyor 9 to continuously convey the cans 2, a cleaning air jetting unit 10 to jet cleaning air to the inner surfaces of the cans 2, and a washing water jetting unit 11 to jet washing water to the inner surfaces of the cans 2. The cleaning air jetting unit 10 and the washing water jetting unit 11 are arranged in this order from upstream along a conveying path of the cans 2 conveyed by the conveyor 9.

The conveyor 9 includes multiple guide rails 9*a* defining the conveying path of the cans 2. The space surrounded by the guide rails 9*a* serves as the conveying path of the cans 2. Each guide rail 9*a* is formed from, for example, a stainless steel rod. The conveyor 9 conveys an adjustable number of cans 2 per unit time (conveying rate). The rate is set to 1250 to 1500 per minute in the present embodiment. The cans 2 with a diameter of about 53 mm are thus conveyed at a conveying rate of about 1.1 to 1.3 m/s.

The conveying path of the cans 2 is inclined downward from upstream to downstream as a whole with respect to the horizontal line at an angle ranging from 20 to 30 degrees, or specifically 25 degrees. The cans 2 are pushed by their weight and by the cans 2 upstream to be continuously conveyed from upstream to downstream along the conveying path.

The conveyor 9 may include balance nozzles and propulsion nozzles as appropriate to jet air or water to the side surfaces or the bottom surfaces of the cans 2 to maintain their postures, and to facilitate their conveyance.

In the conveyor 9, the conveying path is twisted while the relative positions of the guide rails 9*a* are maintained. This allows the cans 2 received from the storage facility 3 in the posture of standing upright with the openings 2*a* facing upward to change the posture to being inverted with the openings 2*a* facing downward, again to change the posture from being inverted to standing upright, or to a filling posture, and then to be fed to the filling facility 5.

The postures of standing upright, lying flat, and being inverted refer to the postures of the cans 2 conveyed on the conveying path. Thus, the opening 2*a* facing upward with the can 2 standing upright refers to the opening 2*a* facing in a direction inclined downward from the vertical direction by the inclination of the conveying path. The opening 2*a* facing downward with the can 2 being inverted refers to the opening 2*a* facing in a direction inclined upward from the vertical direction by the inclination of the conveying path.

The conveying path maintains the posture of the cans 2 being inverted, which are washed with the washing water, for a distance long enough to be drained, and then changes the posture to the filling posture, rather than changes the posture from being inverted to the filling posture immediately after the cans 2 pass the area including the washing water jetting unit 11. The inner surfaces of the cans 2 after being washed with the washing water are naturally dried while the cans 2 are being transported to the filling facility 5. Oxygen dissolved in the washing water entering the products may affect the quality of the canned beverages. However, the drying eliminates the above issue.

Figure 3:
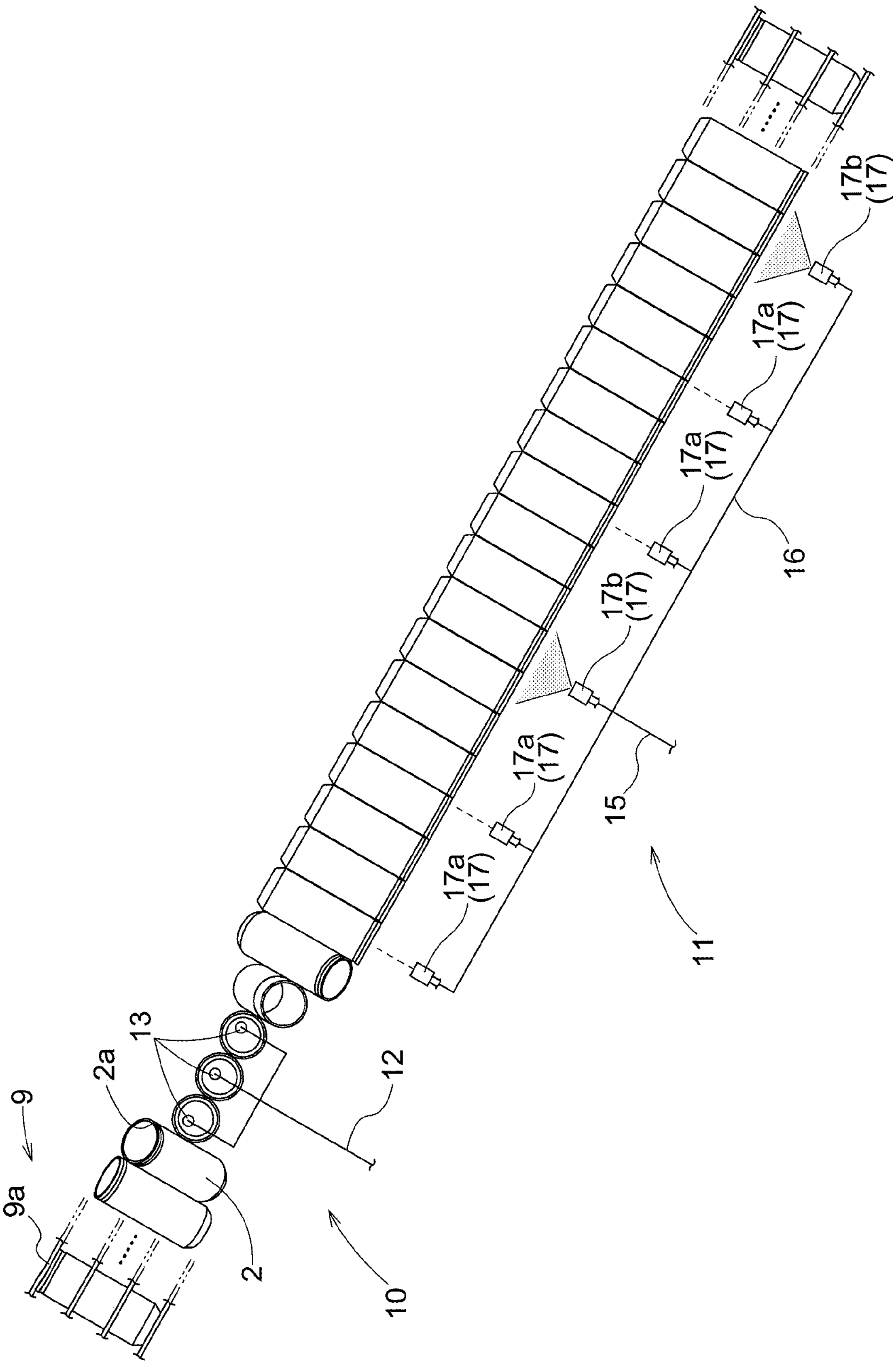
FIG. 3 is a schematic side view of the container washing facility.

In the present embodiment, as shown in FIGS. 2 and 3, the cleaning air jetting unit 10 is located along the conveying path, particularly in an area corresponding to an area in which the cans 2 are lying flat while changing the postures from standing upright to being inverted. The washing water jetting unit 11 is located downstream from the cleaning air jetting unit 10 along the conveying path in an area corresponding to an area in which the cans 2 are fully inverted.

The cleaning air jetting unit 10 includes an air supply (not shown), air piping 12, and air nozzles 13 to jet the cleaning air to the inner surfaces of the cans 2 through the openings 2*a* of the cans 2. The cleaning air jetting unit 10 includes a filter assembly including a filter to remove foreign matter from the cleaning air to be jetted by the air nozzles 13.

The cleaning air jetting unit 10 is controllable, in response to the control over the conveyor 9, to jet the cleaning air during the cans 2 being conveyed, or to stop jetting the cleaning air during the cans 2 not being conveyed.

The air nozzles 13 each have a jet pattern extending straight in the jetting direction of the cleaning air. The jetted cleaning air generates an air flow that reaches the bottom surface of the inner surface of the can 2 without hitting the side surface of the can 2, travels along the inner surface of the can 2, and then is discharged through the opening 2*a*.

To jet the cleaning air to reliably reach the bottom surface of the inner surface of the can 2, the air nozzles 13 each are located, in an area in which the openings 2*a* of the cans 2 lying flat pass, at the height of 0.75 to 0.85 from the lowest portion of the opening 2*a* of the can 2 lying flat with respect to the height of each opening 2*a* being 1, and jet the cleaning air in a direction orthogonal to the conveying direction of the cans 2. With the opening 2*a* having an inner diameter of 52.7 mm, the height of 0.75 to 0.85 from the lowest portion of the opening 2*a* corresponds to the height of about 40 to 43 mm.

In the present embodiment, multiple air nozzles 13 (three in the present embodiment) are arranged at intervals of 60 to 100 mm (60 mm in the present embodiment) in the conveying direction of the cans 2. Setting the number of and the intervals between the air nozzles 13 as described above can reduce the amount of cleaning air to be used, while producing sufficient cleaning effects. However, the above number of and the above intervals between the air nozzles 13 are examples and may be set differently. When multiple air nozzles 13 are used, their specifications may be different from one another. The intervals between adjacent air nozzles 13 may be different from one another in accordance with the specifications.

The flow rate and the pressure of the cleaning air jetted by the air nozzles 13 are set as appropriate in accordance with, for example, the number of air nozzles 13 and the diameter of their openings. The flow rate of the cleaning air jetted by the air nozzles 13 ranges from 100 to 200 L/min. The jetting pressure of the cleaning air ranges from 0.10 to 0.20 MPa. The cleaning air jetting unit 10 jets an adjustable amount of cleaning air in accordance with the number of cans 2 conveyed by the conveyor 9 per unit time (conveying rate). Setting the conditions of the cleaning air jetted by the air nozzles 13 as described above can reduce the amount of cleaning air to be used, while producing sufficient cleaning effects.

The washing water jetting unit 11 includes a washing water supply (not shown), water piping 15, a header pipe 16 being at a predetermined distance from the conveying path, and multiple water nozzles 17 arranged on the header pipe 16 at predetermined intervals. The washing water jetting unit 11 includes a filter assembly including a filter to remove foreign matter from the washing water to be jetted by the water nozzles 17.

The water nozzles 17 include first water nozzles 17*a* each having a first jet pattern and second water nozzles 17*b* each having a second jet pattern. The first jet pattern spreads with a jet angle of 40 degrees in the conveying direction of the cans 2 with the center being the jetting direction of the washing water, which may align with a center axis extending through the center of the opening 2*a* of each can 2. The second jet pattern spreads with a jet angle of 90 degrees in a direction orthogonal to the conveying direction of the cans 2. The first water nozzles 17*a* and the second water nozzles 17*b* are at a distance of 30 mm from the openings 2*a* of the cans 2.

The jet angles of the first water nozzles 17*a* and the second water nozzles 17*b*, and the distance from the openings 2*a* described above are examples, and may have different values. For example, the first water nozzles 17*a* may each have a jet angle ranging from 30 to 50 degrees, and the second water nozzles 17*b* may each have a jet angle ranging from 80 to 100 degrees. The distance between the first water nozzles 17*a* and the openings 2*a* may be determined in accordance with the jet angle of the first water nozzles 17*a*, and the distance between the second water nozzles 17*b* and the openings 2*a* may be determined in accordance with the jet angle of the second water nozzles 17*b*.

The washing water jetting unit 11 may include the first water nozzles 17*a* alone, the second water nozzles 17*b* alone, water nozzles 17 with other specifications, or a combination of these. When multiple water nozzles 17 are used, their specifications may be different from one another.

The intervals between adjacent water nozzles 17 may be different from one another in accordance with the specifications.

In the present embodiment, two first water nozzles 17*a* and a single second water nozzle 17*b* arranged at intervals of 180 mm in the conveying direction of the cans 2 form a water nozzle group. Two water nozzle groups are arranged in the conveying direction of the cans 2. The intervals between the water nozzles 17 are determined in accordance with the number of cans 2 conveyed by the conveyor 9 per unit time (conveying rate). The interval between the two first water nozzles 17*a* and the interval between the first water nozzle 17*a* and the single second water nozzle 17*b* are examples, and each may be 180 to 230 mm in the conveying direction of the cans 2. For example, the interval between the first water nozzles 17*a* may be 180 mm and the interval between the first water nozzle 17*a* and the second water nozzle 17*b* may be 230 mm.

The number of water nozzle groups can be determined in accordance with the jetting pressure of the air nozzles 13. For example, two water nozzle groups are sufficient to remove foreign matter with the jetting pressure of the air nozzles 13 being about 0.15 MPa. A single water nozzle group is sufficient to remove foreign matter with the jetting pressure of the air nozzles 13 being about 0.20 MPa.

The flow rate and the pressure of the washing water jetted by the water nozzles 17 are set as appropriate in accordance with, for example, the number of water nozzles 17 and the diameter of their openings. The flow rate of the washing water jetted by each water nozzle 17 may be about 4 L/min (the total flow rate of the six water nozzles 17 used in the present embodiment is about 24 L/min). The pressure of the washing water may be 0.21 to 0.25 MPa.

The washing water jetted by the water nozzles 17 is collected after the inner surfaces of the cans 2 are washed.

The collected water is then filtered with the filter assembly to remove foreign matter, and is then used as washing water for washing away, for example, beverages adhering to the outside of the cans 2 after the seaming process.

The cleaning air jetting unit 10 and the washing water jetting unit 11 may be surrounded by a housing. The housing may be maintained at a positive pressure internally to reduce entry of any foreign matter. The conveyor 9 extends through the housing. At least an exit of the housing includes a draining cover.

In the container washing facility 4 with the structure described above, the cans 2 standing upright and transported from the storage facility 3 are continuously conveyed along the conveying path defined by the guide rails 9*a* in the conveyor 9. Then, the cans 2 change their postures from standing upright to lying flat with the openings 2*a* facing in the lateral direction as viewed from the front in the conveying direction. The cans 2 are cleaned with the cleaning air jetted by the air nozzles 13 in the cleaning air jetting unit 10. The cans 2 then change their postures from lying flat to being inverted with the openings 2*a* facing downward as viewed from the front in the conveying direction. The cans 2 are washed with the washing water jetted by the water nozzles 17 in the washing water jetting unit 11. The fully washed cans 2 have the washing water on the inner surfaces being drained while being inverted, and change to the filling postures before being transported to the filling facility 5.

As described above, the cans 2 are cleaned with the cleaning air supplied by the air nozzles 13 before the cans 2 are washed with the washing water. This structure allows foreign matter, such as hair, shrink films, sheets, and paper powder, adhering to the inner surfaces of the cans 2 difficult to be removed with the washing water alone to separate from the inner surfaces of the cans 2 and removed.

In the above embodiment, the cleaning air jetting unit 10 is located along the conveying path in the area corresponding to the area in which the cans 2 are lying flat while changing their postures from standing upright to being inverted. In some embodiments, the cleaning air jetting unit 10 may be located differently. The cleaning air jetting unit 10 may be located along the conveying path in the area in which the cans 2 are inverted.

In the above embodiment, the example with the container being the two-piece 250 g can of 202 diameter is described. In some embodiments, a different container may be used. The container may be a two-piece 160 g can of 202 diameter, a two-piece 190 g can of 202 diameter, or a differently shaped container. The container may be filled with a material other than beverages.

The embodiment described above is an example according to one or more aspects of the present invention, and the present invention is not limited to those described above. The specific structure and the design of each component may be changed as appropriate within the range producing effects of the present invention.

REFERENCE SIGNS LIST

2 can (container)
2*a* opening
4 container washing facility
9 conveyor
10 cleaning air jetting unit
11 washing water jetting unit
12 air piping
13 air nozzle
15 water piping
17 water nozzle
17*a* first water nozzle
17*b* second water nozzle

The invention claimed is:

1. A container washing facility for washing an inner surface of a container before the container is filled with a material, the container washing facility comprising:

a conveyor comprising an inverted-posture-conveying area configured to convey the container at least in a posture of being inverted with an opening of the container facing downward; and a cleaning air jetting unit and a washing water jetting unit located along a conveying path of the container conveyed by the conveyor, the cleaning air jetting unit including an air nozzle to jet cleaning air and being configured to jet the cleaning air to the inner surface of the container through the opening of the container while the container is being conveyed, and the washing water jetting unit including a water nozzle to jet washing water and being configured to jet the washing water to the inner surface of the container through the opening of the container while the container is being conveyed, wherein the conveyor further comprises a lying-flat-posture-conveying area that conveys the container in a posture of lying flat with the opening facing in a lateral direction in an area upstream of the inverted-posture-conveying area, and in the conveyor, the conveying path is twisted to cause the container to change the posture from lying flat to being inverted;

the cleaning air jetting unit is located to jet the cleaning air into the opening of the container being conveyed in the lying-flat-posture-conveying area.

2. The container washing facility according to claim 1, wherein the washing water jetting unit includes a first water nozzle having a jet pattern spreading in a direction orthogonal to a conveying direction in which the container is conveyed, and a second water nozzle having a jet pattern spreading in the conveying direction of the container.

3. The container washing facility according to claim 2, wherein the first water nozzle has a jet angle ranging from 30 to 50 degrees, and the second water nozzle has a jet angle ranging from 80 to 100 degrees.

4. The container washing facility according to claim 1, wherein the washing water jetting unit is located to jet the washing water into the opening of the container being conveyed in the inverted-posture-conveying area.

5. The container washing facility according to claim 1, wherein the cleaning air jetting unit includes an air nozzle having a jet pattern extending straight in a jetting direction in which the cleaning air is jetted.

6. The container washing facility according to claim 1, wherein the cleaning air jetting unit is located to jet the cleaning air from a height of 0.75 to 0.85 from a lowest portion of the opening of the container with respect to a height of the opening being 1.

7. The container washing facility according to claim 1, wherein the conveying path is twisted between the lying-flat-posture-conveying area and the inverted-posture-conveying area.

* * * * *